US012139972B2

(12) United States Patent
Romer et al.

(10) Patent No.: US 12,139,972 B2
(45) Date of Patent: Nov. 12, 2024

(54) CAPACITIVE CABLE FOR A DOWNHOLE ELECTRO-HYDRAULIC TOOL

(71) Applicant: ExxonMobil Technology and Engineering Company, Spring, TX (US)

(72) Inventors: Michael C. Romer, The Woodlands, TX (US); P. Matthew Spiecker, Manvel, TX (US); Peter A. Gordon, Yardley, PA (US); Dragan Stojkovic, Spring, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 808 days.

(21) Appl. No.: 17/228,763

(22) Filed: Apr. 13, 2021

(65) Prior Publication Data

US 2022/0098932 A1 Mar. 31, 2022

Related U.S. Application Data

(60) Provisional application No. 63/084,918, filed on Sep. 29, 2020.

(51) Int. Cl.

| | |
|---|---|
| ***E21B 17/02*** | (2006.01) |
| ***E21B 41/00*** | (2006.01) |
| ***H01B 17/28*** | (2006.01) |
| *H01B 7/08* | (2006.01) |

(52) U.S. Cl.
CPC ...... *E21B 17/0283* (2020.05); *E21B 41/0085* (2013.01); *H01B 17/28* (2013.01); *H01B 7/08* (2013.01)

(58) Field of Classification Search
CPC ......................... E21B 17/0283; E21B 17/0005
See application file for complete search history.

(56) References Cited

U.S. PATENT DOCUMENTS

| | | | | |
|---|---|---|---|---|
| 4,345,650 A * | 8/1982 | Wesley | E21B 43/003 | 166/177.2 |
| 4,858,063 A * | 8/1989 | Laue | G01N 27/225 | 73/335.04 |
| 2017/0045633 A1* | 2/2017 | Moncho | E21B 49/00 | |

* cited by examiner

*Primary Examiner* — Lam S Nguyen
(74) *Attorney, Agent, or Firm* — ExxonMobil Technology and Engineering Company—Law Department

(57) ABSTRACT

A capacitive cable, as well as a method for operating a downhole electro-hydraulic (EH) tool using the capacitive cable, are described herein. The capacitive cable includes at least one standard conductor and at least one capacitive conductor including integrated wire-shaped capacitors. The method includes inserting a tool string including the capacitive cable and an attached downhole EH tool into a wellbore and conducting power from the surface to the downhole EH tool via the standard conductor(s) of the capacitive cable. The method also includes storing electrical energy downhole within the capacitive conductor(s) of the capacitive cable, and activating the downhole EH tool to provide for the rapid release of the electrical energy from the capacitive conductor(s) into the downhole EH tool, initiating an electro-hydraulic event within the wellbore.

19 Claims, 6 Drawing Sheets

100

200

208

306

600

CAPACITIVE CABLE FOR A DOWNHOLE ELECTRO-HYDRAULIC TOOL

CROSS REFERENCE TO RELATED APPLICATIONS

This application claims the benefit of U.S. Provisional Application 63/084,918, filed Sep. 29, 2020, the disclosure of which is hereby incorporated by reference in its entirety.

FIELD OF THE INVENTION

The techniques described herein relate to the field of hydrocarbon well completions and downhole operations. More particularly, the techniques described herein relate to a capacitive cable that may be used for a downhole electro-hydraulic tool.

BACKGROUND OF THE INVENTION

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

In the drilling of hydrocarbon wells, a wellbore is formed within a formation using a drill bit that is urged downwardly at the lower end of a drill string until it reaches a predetermined bottomhole location. The drill string and bit are then removed, and the wellbore is lined with steel tubulars, commonly referred to as casing strings or liners. An annulus is thus formed between the casing strings and the surrounding subsurface formation. A cementing operation is typically conducted to fill the annulus with columns of cement. The combination of the casing strings and the cement strengthens the wellbore and isolates or impedes fluid flow and pressure transmissibility along the annulus.

It is common to place several casing strings having progressively-smaller outer diameters into the wellbore. The first casing string may be referred to as the "surface casing string." The surface casing string serves to isolate and protect the shallower, freshwater-bearing aquifers from contamination by any other wellbore fluids. Accordingly, this casing string is almost always cemented entirely back to the surface.

A process of drilling and then cementing progressively-smaller casing strings is repeated several times below the surface casing string until the hydrocarbon well has reached total depth. The final casing string, referred to as the "production casing string," extends through a hydrocarbon-bearing interval within the formation, referred to as a "reservoir." In some instances, the production casing string is a liner, that is, a casing string that is not tied back to the surface. The production casing string is also typically cemented into place. In some completions, the production casing string has swell packers or external casing packers spaced across selected productive intervals. This creates compartments between the packers for isolation of stages and specific stimulation treatments. In this instance, the annulus may simply be packed with subsurface formation sand.

As part of the completion process, the production casing string is perforated at a desired level. This means that lateral holes are shot through the production casing string and the cement column surrounding the production casing string using a perforating gun. In operation, the perforating gun is used to create multiple perforation clusters within each stage of the hydrocarbon well. These perforation clusters provide flow paths for hydrocarbon fluids from the surrounding reservoir to flow into the hydrocarbon well.

After the perforation process is complete, the reservoir is typically fractured at the corresponding stage to increase the reservoir's productivity. Hydraulic fracturing has become a common method for fracturing reservoirs. Hydraulic fracturing consists of injecting a volume of fracturing fluid through the created perforations and into the surrounding reservoir at such high pressures and rates that the reservoir rock in proximity to the perforations cracks open, and extends outwardly in proportion to the injected fluid volume. Ideally, separate fractures emanate outwardly from each of the created perforations, forming a set of fractures within the surrounding reservoir.

A relatively new offshoot of hydraulic fracturing, referred to as "electro-hydraulic fracturing (EHF)", is currently being developed. Electro-hydraulic fracturing is broadly based on electro-hydraulic discharge (EHD) techniques, which are used to convert rapidly-discharged electrical energy into mechanical work. EHF technologies, in particular, utilize various EHD techniques to provide for repeatable, rapid, high-intensity wellbore loading. This is particularly useful for increasing the productivity of "unconventional," or "tight," reservoirs, which are reservoirs with low permeability that typically do not produce economically without some form of hydraulic fracturing. Examples of unconventional reservoirs include tight sandstone reservoirs, tight carbonate reservoirs, shale gas reservoirs, coal bed methane reservoirs, tight oil reservoirs, and/or tight limestone reservoirs.

Various EHF technologies are currently under development. Specifically, one EHF technology, referred to as "pulsed arc (or electro-hydraulic) discharge", involves using an electrical discharge to induce the ionization of a dielectric, resulting in the formation of a plasma. The collapse of the plasma then induces an acoustic shock wave that is capable of fracturing the formation. Another EHF technology, referred to as the "exploding wire" process, induces loading on the formation via electrical discharge into a wire, which induces large ohmic heating to the point of explosion. Moreover, another EHF technology involves generating electro-hydraulic shock waves via plasma-ignited energetic materials, such as chemical explosives.

All of these EHF technologies require a large amount of electrical energy, delivered in the form of a rapid, high-energy pulse, to initiate the electrical discharge and the resulting reaction. Accordingly, several techniques have been developed for storing and releasing electrical energy in downhole electro-hydraulic applications. Specifically, one technique involves generating the electrical energy at the surface, storing the electrical energy within capacitors located at the surface, and then transferring the electrical energy downhole when the electro-hydraulic (EH) tool is activated. However, this technique requires the creation and maintenance of a special conductive pathway between the surface capacitors and the downhole EH tool. Moreover, while custom, high-power, threaded concentric conductors (i.e., electric tubing joints) have been developed for this purpose, such specialized conductors are costly to produce and deploy. Another technique involves generating the electrical energy at the surface, transferring the electrical energy downhole via a standard wireline, and storing the electrical energy downhole within an independent capacitor bank that is proximate to the EH tool. However, the size of the capacitor bank and, thus, the amount of energy that can be stored downhole, is limited by the relatively small amount of space available within the wellbore. Therefore, there exists a need for improved energy storage techniques for electro-hydraulic applications.

SUMMARY OF THE INVENTION

An embodiment described herein provides a capacitive cable, including at least one standard conductor and at least one capacitive conductor including integrated wire-shaped capacitors. In some embodiments, the capacitive conductor includes bundles of wire-shaped capacitors configured in series, and each bundle includes wire-shaped capacitors configured in parallel. In such embodiments, the capacitive conductor may include 400-4,000 bundles, and each bundle may include 5-9 wire-shaped capacitors configured in parallel. Moreover, in such embodiments, adjoining bundles may be connected to each other via a thin ribbon of conductive material. Furthermore, in various embodiments, the capacitive conductor includes one or more capacitive conductor sections spliced to one or more standard conductor sections. The total energy storage capacity of the capacitive conductor may be between 30-450 kilojoules (kJ).

Another embodiment described herein provides a method for operating a downhole electro-hydraulic (EH) tool using a capacitive cable. The method includes inserting a tool string including a capacitive cable and an attached downhole EH tool into a wellbore, wherein the capacitive cable includes at least one standard conductor and at least one capacitive conductor including integrated wire-shaped capacitors. The method also includes conducting power from a surface to the downhole EH tool via standard conductor(s) of the capacitive cable and storing electrical energy downhole within the capacitive conductor(s) of the capacitive cable. The method also includes activating the downhole EH tool to provide for the rapid release of the electrical energy from the capacitive conductor(s) into the downhole EH tool, initiating an electro-hydraulic event within the wellbore.

In some embodiments, the method includes providing the capacitive conductor(s) of the capacitive cable by forming bundles of wire-shaped capacitors, wherein each bundle includes multiple wire-shaped capacitors configured in parallel, and connecting the bundles in series using a thin ribbon of conductive material between adjoining bundles. In such embodiments, the method may include forming each bundle using 5-9 wire-shaped capacitors configured in parallel, as well as connecting 400-4,000 bundles in series. The method may further include providing the capacitive conductor(s) of the capacitive cable by splicing one or more capacitive conductor sections to one or more standard conductor sections.

In some embodiments, storing the electrical energy downhole within the capacitive conductor(s) includes storing between 30-450 kJ within the capacitive conductor(s). Moreover, in some embodiments, activating the downhole EH tool to initiate the electro-hydraulic event within the wellbore includes activating the downhole EH tool to initiate electro-hydraulic fracturing of a formation surrounding the wellbore in a vicinity of the EH tool.

Another embodiment described herein provides a tool string that includes a capacitive cable and a downhole EH tool that is coupled to the capacitive cable. The capacitive cable includes at least one standard conductor and at least one capacitive conductor including integrated wire-shaped capacitors. The capacitive cable is configured to deliver power from the surface to the downhole EH tool via the standard conductor(s), store electrical energy downhole within the capacitive conductor(s), and rapidly deliver the electrical energy from the capacitive conductor(s) to the downhole EH tool in response to an activation of the downhole EH tool.

In some embodiments, the capacitive conductor includes bundles of wire-shaped capacitors configured in series, and each bundle includes wire-shaped capacitors configured in parallel. In such embodiments, the capacitive conductor may include 400-4,000 bundles, and each bundle may include 5-9 wire-shaped capacitors configured in parallel. Moreover, in such embodiments, adjoining bundles may be connected to each other via a thin ribbon of conductive material. Furthermore, in various embodiments, the capacitive conductor includes one or more capacitive conductor sections spliced to one or more standard conductor sections. The total energy storage capacity of the capacitive conductor may be between 30-450 kJ.

BRIEF DESCRIPTION OF THE DRAWINGS

The foregoing and other advantages of the present techniques may become apparent upon reviewing the following detailed description and drawings of non-limiting examples in which.

Figure 1:
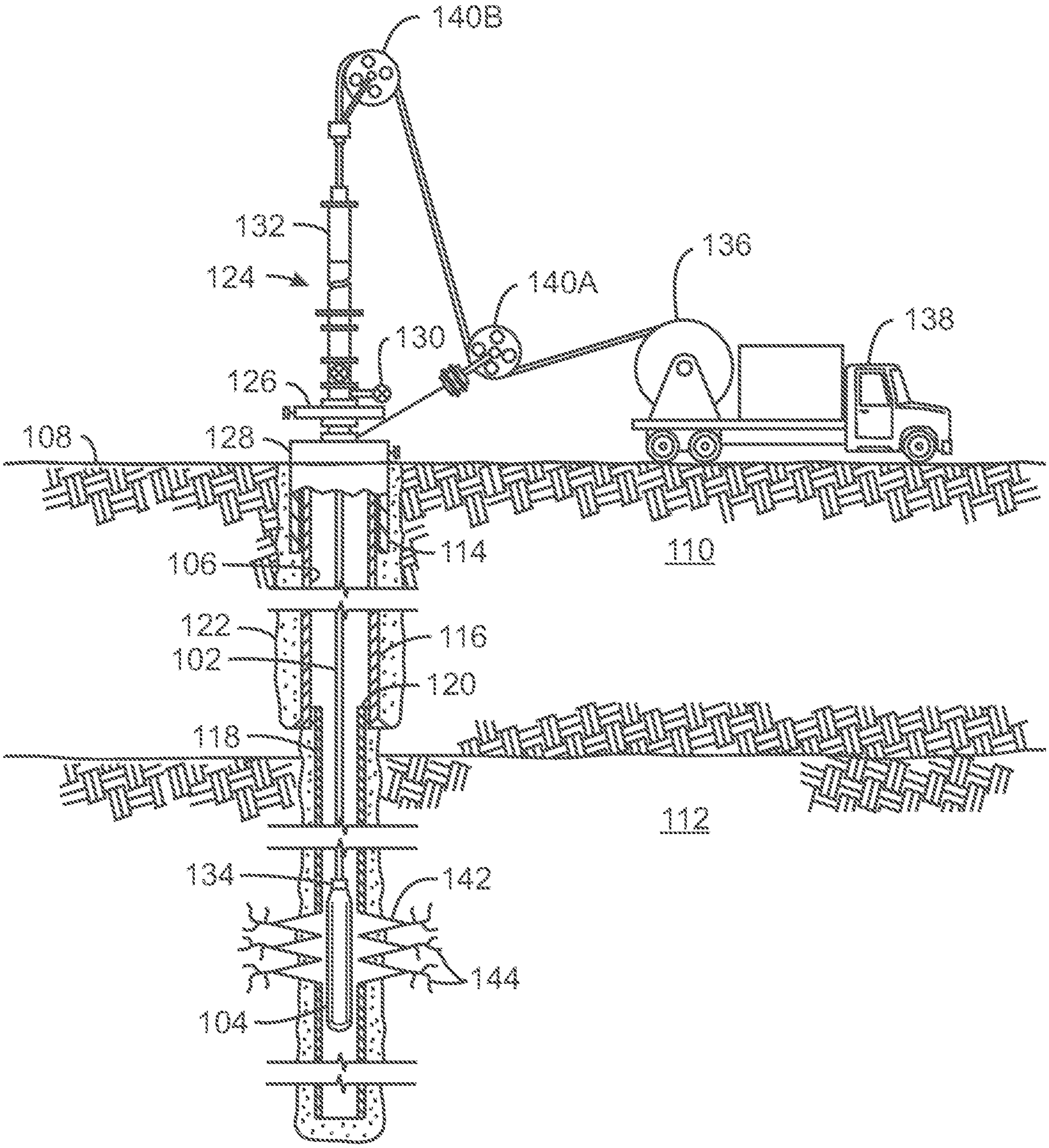
FIG. 1 is a schematic view of an exemplary embodiment of a hydrocarbon well in which a capacitive cable may be used to operate a downhole electro-hydraulic (EH) tool.

It should be noted that the figures are merely examples of the present techniques, and no limitations on the scope of the present techniques are intended thereby. Further, the figures are generally not drawn to scale, but are drafted for purposes of convenience and clarity in illustrating various aspects of the techniques.

DETAILED DESCRIPTION OF THE INVENTION

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the terms "a" and "an" mean one or more when applied to any embodiment described herein. The use of "a" and "an" does not limit the meaning to a single feature unless such a limit is specifically stated.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

The phrase "at least one," in reference to a list of one or more entities, should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the term "configured" mean that the element, component, or other subject matter is designed and/or intended to perform a given function. Thus, the use of the term "configured" should not be construed to mean that a given element, component, or other subject matter is simply "capable of" performing a given function but that the element, component, and/or other subject matter is specifically selected, created, implemented, utilized, and/or designed for the purpose of performing the function.

As used herein, the terms "example," exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure or method is not intended to be limiting, required, or exclusive/exhaustive; and other components, features, structures, or methods, including structurally and/or functionally similar and/or equivalent components, features, structures, or methods, are also within the scope of the present techniques.

"Formation" refers to a subsurface region including an aggregation of subsurface sedimentary, metamorphic and/or igneous matter, whether consolidated or unconsolidated, and other subsurface matter, whether in a solid, semi-solid, liquid and/or gaseous state, related to the geological development of the subsurface region. Moreover, while the term "formation" may generally be used to refer to the entire subsurface region, the term "reservoir" may generally be used to refer to a hydrocarbon-bearing zone or interval within the geologic formation that includes a relatively high percentage of oil and gas.

The term "wellbore" refers to a hole drilled vertically, at least in part, and may also refer to a hole drilled with deviated, highly deviated, and/or horizontal sections. The term "hydrocarbon well" includes the wellbore as well as the associated equipment, such as the wellhead, casing string(s), production tubing, and the like.

Embodiments described herein provide improved energy storage techniques for downhole electro-hydraulic applications. Such improved energy storage techniques allow standard downhole tool deployment methods to be utilized for maximum energy delivery to an electro-hydraulic (EH) tool, such as an EH tool used for an electro-hydraulic fracturing (EHF) process. According to embodiments described herein, this is accomplished using a capacitive cable that includes one or more standard conductors for powering a downhole EH tool, as well as one or more capacitive conductors including wire-shaped capacitors for storing electrical energy downhole and rapidly releasing the electrical energy to the EH tool upon activation. In various embodiments, integrating the energy storage device (i.e., the wire-shaped capacitors) within the downhole tool deployment wireline (i.e., the cable) allows a large amount of electrical energy to be rapidly released to the downhole EH tool in an efficient, cost-effective manner.

Exemplary Hydrocarbon Well Utilizing Capacitive Cable for Operating Downhole Electro-Hydraulic Tool FIG. 1 is a schematic view of an exemplary embodiment of a hydrocarbon well 100 in which a capacitive cable 102 may be used to operate a downhole electro-hydraulic (EH) tool 104. The hydrocarbon well 100 defines a wellbore 106 that extends from a surface 108 into a formation 110 within the earth's subsurface. The formation 110 may include several subsurface intervals, such as a hydrocarbon-bearing interval that is referred to herein as a reservoir 112. In some embodiments, the reservoir 112 is an unconventional, tight reservoir, meaning that it has regions of low permeability. For example, the reservoir 112 may include tight sandstone, tight carbonate, shale gas, coal bed methane, tight oil, and/or tight limestone.

The hydrocarbon well 100 is completed by setting a series of tubulars into the formation 110. These tubulars include several strings of casing, such as a surface casing string 114, an intermediate casing string 116, and a production casing string 118, which is sometimes referred to as a "production liner." In some embodiments, additional intermediate casing strings (not shown) are also included to provide support for the walls of the hydrocarbon well 100.

According to the embodiment shown in FIG. 1, the surface casing string 114 and the intermediate casing string 116 are hung from the surface 108, while the production casing string 118 is hung from the bottom of the intermediate casing string 116 using a liner hanger 120. The surface casing string 114 and the intermediate casing string 116 are set in place using cement 122. The cement 122 isolates the intervals of the formation 110 from the hydrocarbon well 100 and each other. The production casing string 118 may also be set in place using cement 122, as shown in FIG. 1. Alternatively, the hydrocarbon well 100 may be set as an open-hole completion, meaning that the production casing string 118 is not set in place using cement.

The exemplary hydrocarbon well 100 is shown as a vertical completion in FIG. 1. However, it is to be understood that the hydrocarbon well 100 may include any number of lateral, deviated, or highly-deviated sections extending in various directions through the reservoir 112. For example, in some embodiments, the hydrocarbon well 100 includes one or more lateral sections that extend over 1,000 feet (from heel to toe), in which case the hydrocarbon well 100 may be referred to as an extended-reach lateral well. As another example, in some embodiments, the hydrocarbon well 100 includes one or more lateral sections that extend over 10,000 feet (from heel to toe), in which case the hydrocarbon well 100 may be referred to as an ultra-extended-reach lateral well.

As shown in FIG. 1, the hydrocarbon well 100 includes a wellhead 124. The wellhead 124 may include any arrangement of pipes and valves for controlling the hydrocarbon well 100. In some embodiments, the wellhead 124 is a so-called "Christmas tree." A Christmas tree is typically used when the subsurface formation 110 has enough in-situ pressure to drive hydrocarbon fluids from the reservoir 112, up the wellbore 106, and to the surface 108. The illustrative wellhead 124 shown in FIG. 1 includes an upper master fracture valve 126 and a lower master fracture valve 128 that provide for the isolation of wellbore pressures above and below their respective locations. Furthermore, the wellhead 124 includes a side outlet injection valve 130 that can be used to control the injection of fluid, such as fracturing fluid, into the wellbore 106.

In various embodiments, the wellhead 124 also couples the wellbore 106 to other equipment, such as equipment for running a wireline, such as the capacitive cable 102 described herein, into the wellbore 106. In the embodiment shown in FIG. 1, the equipment for running the wireline into the wellbore 106 includes a lubricator 132, which may extend as much as 75 feet above the wellhead 124. In this respect, the lubricator 132 must be of a length greater than the length of the bottomhole assembly (BHA) attached to the wireline 102 to ensure that the BHA may be safely deployed into the wellbore 106 and then removed from the wellbore 106 under pressure. According to the embodiment shown in FIG. 1, the BHA includes the downhole EH tool 104, as well as a cable head 134 that couples the downhole EH tool 104 to the capacitive cable 102. However, it is to be understood that the BHA may also include additional equipment, such as a perforating gun or similar equipment for assisting with the completion process and/or the fracturing process. Moreover, according to embodiments described herein, the combination of the capacitive cable 102, the cable head 134, and the downhole EH tool 104 (as well as any additional equipment that is attached to the capacitive cable 102) is referred to as a "tool string".

In various embodiments, the tool string is inserted into (or lifted out of) the wellbore 106 on demand by deploying the capacitive cable 102 from a spool (or reel) 136, which may be attached to a wireline truck 138 (or a stand-alone unit). In operation, the capacitive cable 102 may be unwound from the spool 136 and lowered into the wellbore 106 using multiple sheaves 140A and 140B that are attached to the wellhead 124. This process may be controlled using instrumentation, such as a surface controller (not shown), located at the well site. For example, the instrumentation may be located on the wireline truck 138, or may be integrated into an overall mobile command center (not shown) for the well site.

As shown in FIG. 1, the wellbore may be completed such that the lower end of the production tubing string 118 includes perforations 142 that provide flow paths for hydrocarbon fluids to flow from the reservoir 112 into the wellbore 106. However, in many cases, the characteristics of the reservoir 112 are such that hydrocarbon fluids cannot be economically produced from the reservoir 112 via the perforations 142 alone. Therefore, a fracturing process may be used to create fractures 144 extending outwards from the near-wellbore region of the reservoir 112. The fractures 144 provide flow channels for the extraction of hydrocarbon fluids from the reservoir 112. According to embodiments described herein, an electro-hydraulic fracturing (EHF) process may be performed for this purpose. The EHF process involves using the downhole EH tool 104 to initiate an electro-hydraulic event that induces the fractures 144 within the near-wellbore region of the reservoir 112.

The downhole EH tool 104 may include several different configurations depending on which EHF technique is to be performed. For example, in some embodiments, the downhole EH tool 104 is configured as a pulsed arc (or electro-hydraulic) discharge tool. In such embodiments, the downhole EH tool 104 creates the fractures 144 within the reservoir 112 using acoustic shock waves that are produced via the rapid release of electrical energy into a dielectric medium. This may be accomplished by designing the downhole EH tool 104 with a "water gap" configuration, which includes a gap between two electrodes that is filled with the dielectric medium. When the downhole EH tool 104 is activated, such as via a command from a surface controller located at the surface, electrical energy is rapidly released from the capacitive cable 102, resulting in large currents passing from the high-voltage electrode to the ground electrode via the water gap. These large currents exceed the breakdown energy of the surrounding dielectric medium. This results in the ionization of the dielectric medium, creating a plasma in the vicinity of the electrodes. The volume of the plasma grows until the energy in the capacitive cable 102 is drained, leading to the rapid collapse of the high-temperature, high-pressure plasma. This results in the generation of an acoustic shock wave that radiates away from the downhole EH tool 104, inducing the fractures 144 within the surrounding reservoir 112.

In other embodiments, the downhole EH tool 104 is configured as an "exploding wire" tool. In such embodiments, the downhole EH tool 104 is designed with a conductive wire connecting the two electrodes, with the dielectric medium surrounding the conductive wire and the two electrodes. When the downhole EH tool 104 is activated, such as via a command from a surface controller located at the surface, electrical energy is released from the capacitive cable 102, resulting in large currents passing from the high-voltage electrode to the ground electrode via the conductive wire. These large currents cause the conductive wire to explode, generating an acoustic shock wave within the dielectric medium that radiates away from the downhole EH tool 104, inducing the fractures 144 within the surrounding reservoir 112.

Moreover, in some embodiments, the downhole EH tool 104 includes an exploding wire configuration with added chemical explosives. In such embodiments, conventional chemical explosives may be wrapped around the conductive wire. Moreover, in such embodiments, the type(s) and amount(s) of chemical explosives included within the downhole EH tool 104 may be selectively determined to fine-tune the strength of the resulting acoustic shock wave.

According to embodiments described herein, the capacitive cable 102 includes one or more standard conductors and one or more capacitive conductors. The capacitive cable 102 is connected to a high-voltage power supply (not shown) located at the surface 108. For example, the capacitive cable 102 may be connected to the high-voltage power supply via direct connection to a power unit on the wireline truck 138, or via connection to a separate power unit skid positioned near the wireline truck 138.

The standard conductor(s) within the capacitive cable 102 are configured to provide power from the high-voltage power supply to the downhole EH tool 104, while the capacitive conductor(s) within the capacitive cable 102 are configured to store electrical energy downhole and then rapidly release the electrical energy upon activation of the downhole EH tool 104. In some embodiments, the number of standard conductors and capacitive conductors included within the capacitive cable 102 is optimized based on the energy storage requirements and expected depth of deployment for the particular application.

In various embodiments, the capacitive conductor(s) include multiple wire-shaped capacitors that are electrically connected in any suitable configuration to meet the voltage, current, and energy storage specifications for the particular application. Moreover, in some embodiments, the design of the capacitive conductor(s) may be optimized by splicing one or more capacitive conductor sections to one or more standard conductor sections. For example, the capacitive conductor(s) may include standard conductor sections near the top of the wellbore 106 to provide additional tensile strength, and capacitive conductor sections near the bottom of the wellbore 106 to provide maximum energy storage capacity near the downhole EH tool 104. In various embodiments, integrating the capacitive conductor(s) within the capacitive cable 102 allows a large amount of electrical energy to be rapidly released to the downhole EH tool 104 in an efficient, cost-effective manner. More details regarding specific embodiments of the capacitive cable 102 described herein are provided with respect to FIGS. 2-5.

The schematic view of FIG. 1 is not intended to indicate that the hydrocarbon well 100 is to include all of the components shown in FIG. 1, or that the hydrocarbon well 100 is limited to only the components shown in FIG. 1. Rather, any number of components may be omitted from the hydrocarbon well 100 or added to the hydrocarbon well 100, depending on the details of the specific implementation. For example, while the hydrocarbon well 100 is depicted in FIG. 1 as a single-stage well including only one set of perforations (and corresponding fractures), this is for ease of discussion only. It will be appreciated by one of skill in the art that the hydrocarbon well 100 is likely to include a number of separate stages extending through the reservoir 112. For example, the hydrocarbon well 100 may include more than 20 stages, with each stage including around 3-20 sets of perforations (and corresponding fractures), and with each set of perforations (and corresponding fractures) being spaced around 10-100 feet apart.

Furthermore, while FIG. 1 relates to the use of the capacitive cable described herein for an EHF process, the capacitive cable described herein may also be used to operate a downhole EH tool for any other suitable type of electro-hydraulic application. For example, in some embodiments, the capacitive cable described herein is used to operate a downhole EH tool for an enhanced oil recovery (EOR) operation. As another example, in some embodiments, the capacitive cable described herein is used to operate an EH setting tool for rapidly setting downhole plugs, packers, or the like.

Exemplary Embodiment of Capacitive Cable Described Herein

Figure 2:
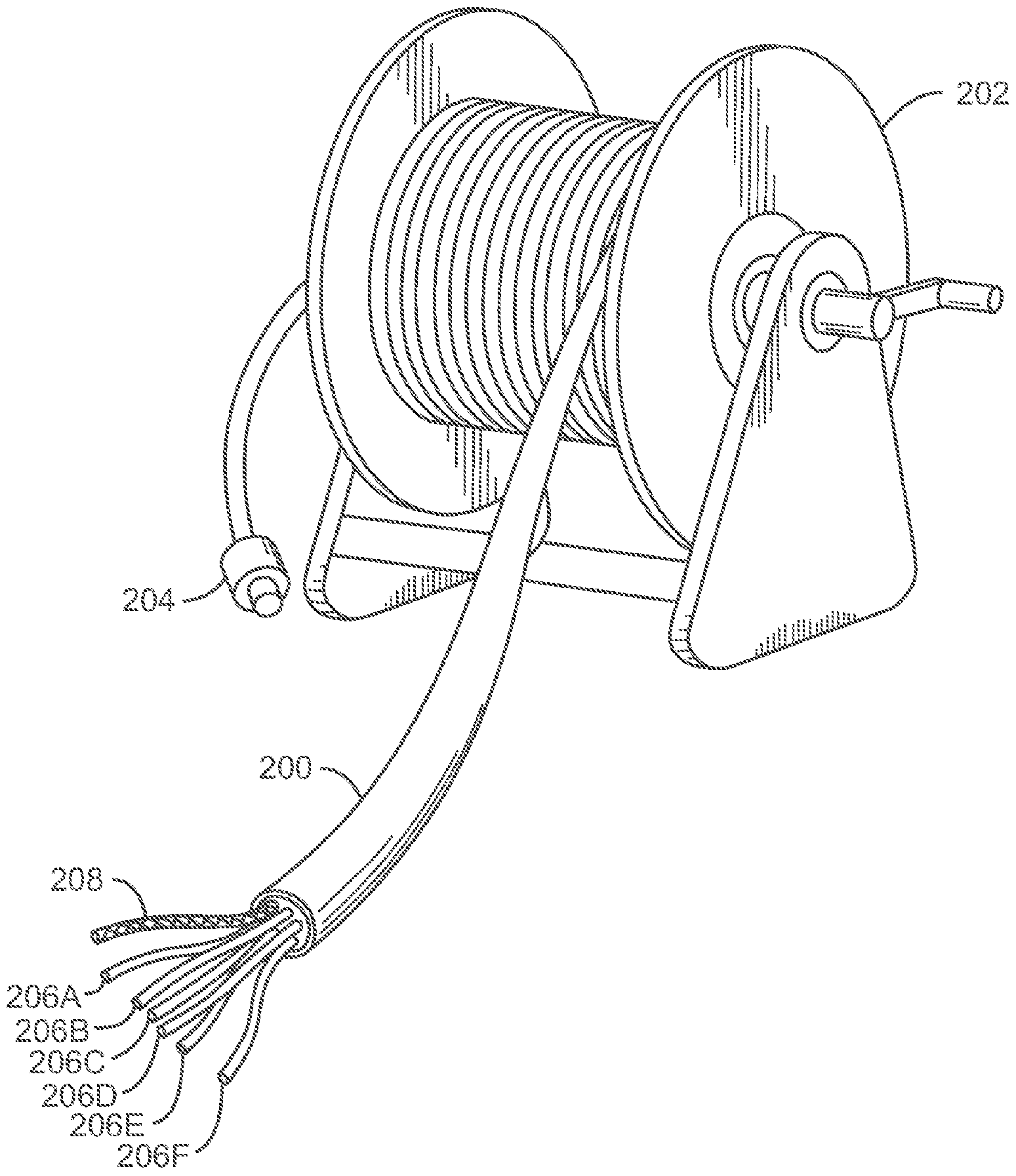
FIG. 2 is a perspective schematic view of an exemplary embodiment of a capacitive cable wound around a spool.

FIG. 2 is a perspective schematic view of an exemplary embodiment of a capacitive cable 200 wound around a spool 202. In various embodiments, the capacitive cable 200 is used to operate a downhole EH tool. For example, the capacitive cable 200 may be used to operate a downhole EH tool for an EHF process, as described with respect to FIG. 1. Moreover, in some embodiments, the spool 202 is integrated into a wireline truck, such as the wireline truck 138 described with respect to FIG. 1. In other embodiments, the spool 202 is integrated into a stand-alone or skid-mounted unit, depending on the details of the specific implementation.

In various embodiments, the capacitive cable 200 is customized based on the desired voltage rating, capacitance per unit length, total energy storage capacity, and total cable length for each application. For example, the capacitive cable 200 may be at least 1,000 feet long, at least 5,000 feet long, at least 10,000 feet long, or at least 30,000 feet long, depending on the details of the specific implementation. As shown in FIG. 2, one end of the capacitive cable 200 includes a connector 204 for connecting the capacitive cable 200 to a power source, such as a high-voltage power supply located at the surface. FIG. 2 also shows the other end of the capacitive cable 200, which has been sliced open to reveal the inside of the capacitive cable 200. According to the embodiment shown in FIG. 2, the capacitive cable 200 includes six standard electrical conductors 206A-F and one capacitive conductor 208. However, it is to be understood that the capacitive cable 200 may include any suitable combination of standard electrical conductors and capacitive conductors, depending on the details of the specific implementation. For example, the capacitive cable 200 may include five standard electrical conductors and two capacitive conductors. As other examples, the capacitive cable 200 may be a three-conductor cable including two standard electrical conductors and one capacitive conductor, or a nine-conductor cable including seven standard electrical conductors and two capacitive conductors.

Figure 3:
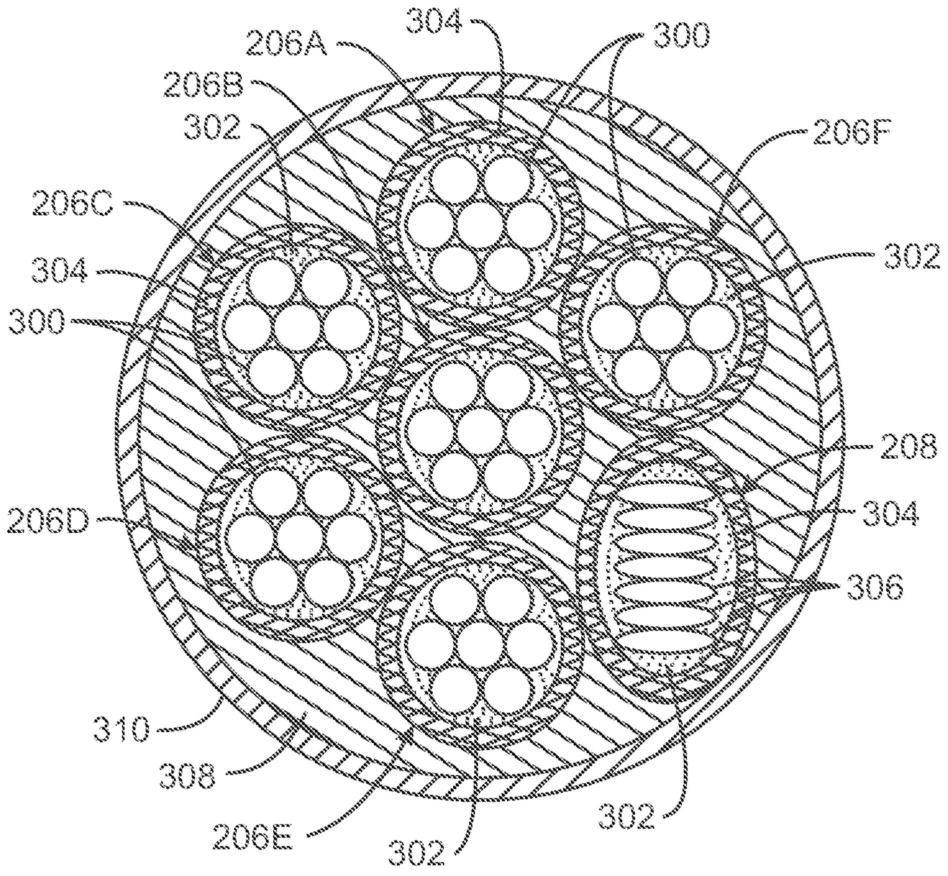
FIG. 3 is a cross-sectional schematic view of an exemplary embodiment of the capacitive cable described with respect to FIG. 2.

FIG. 3 is a cross-sectional schematic view of an exemplary embodiment of the capacitive cable 200 described with respect to FIG. 2. Like numbered items are as described with respect to FIG. 2. As shown in FIG. 3, each standard electrical conductor 206A-F includes a core of internal conductive wires 300. Each conductive wire 300 may be fabricated from copper, such as soft-drawn, tin-coated copper (SDTC), for example, and stranded for flexibility. Moreover, each standard electrical conductor 206A-F may be wrapped in insulation 302, such as a high-dielectric thermoplastic insulation, for example, as well as an outer jacket 304, which may be constructed from electrical-grade thermoplastic insulation, for example.

Furthermore, as shown in FIG. 3, the capacitive conductor 208 includes bundles of wire-shaped capacitors 306 configured in parallel. Specifically, according to the embodiment shown in FIG. 3, each bundle includes seven wire-shaped capacitors 306 configured in parallel. In addition, the capacitive conductor 208 may include any number of bundles configured in series along the length of the capacitive cable 200, as described further with respect to FIG. 4. Moreover, similarly to the standard electrical conductors 206A-F, the capacitive conductor 208 may include insulation 302 and an outer jacket 304 surrounding the wire-shaped capacitors 306.

In various embodiments, the outside of the standard electrical conductors 206A-F and the capacitive conductor 208 is also surrounded with insulation 308, such as a high-dielectric thermoplastic insulation, for example. Moreover, the capacitive cable 200 itself may include an armor 310, which may be constructed of galvanized steel, for example. The armor 310 provides mechanical protection that allows the capacitive cable 200 to withstand high stress environments. In addition, the armor 310 protects the wire-shaped capacitors 306 within the capacitive conductor 208 from being damaged by the shock waves generated by the downhole EH tool.

Figure 4:
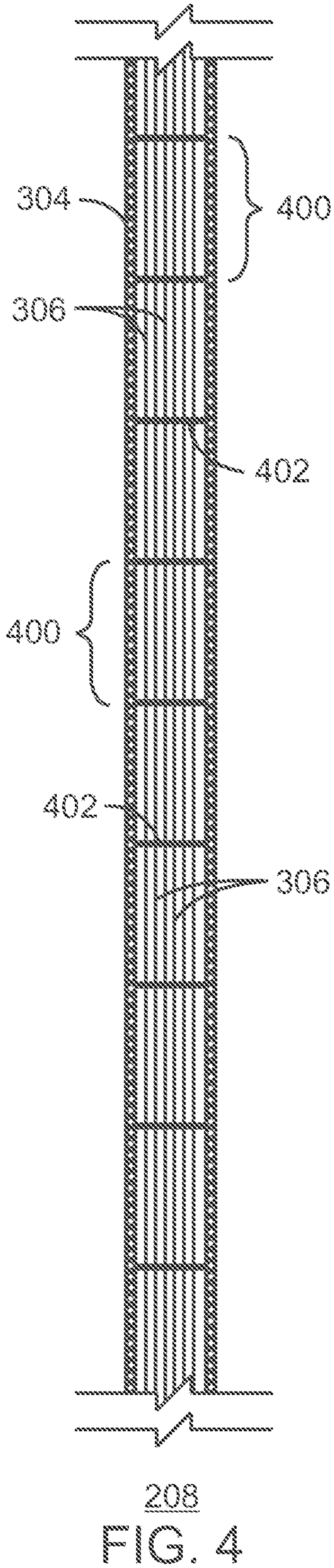
FIG. 4 is a cross-sectional schematic view of an exemplary embodiment of the capacitive conductor that is integrated within the capacitive cable described herein.

FIG. 4 is a cross-sectional schematic view of an exemplary embodiment of the capacitive conductor 208 that is integrated within the capacitive cable 200 described herein. Like numbered items are as described with respect to FIGS. 2 and 3. As shown in FIG. 4, the wire-shaped capacitors 306 within the capacitive conductor 208 are arranged into bundles 400, with adjoining bundles 400 being connected to each other in series via thin ribbons of conductive material 402.

In various embodiments, the capacitive conductor 208 includes 400-4,000 bundles configured in series, and each bundle 400 includes 5-9 wire-shaped capacitors 306 configured in parallel. In some embodiments, each wire-shaped capacitor 306 is between 1-6 millimeters (mm) wide and 50-150 mm long. For example, in a preferred embodiment, each wire-shaped capacitor 306 is approximately 4 mm wide and 100 mm long. Further, in some embodiments, each wire-shaped capacitor 306 includes a voltage rating of between 1-4 volts (V) and a capacitance value of between 1-6 farads (F). For example, in a preferred embodiment, each wire-shaped capacitor 306 includes a voltage rating of approximately 2 V and a capacitance value of approximately 4 F. Furthermore, in various embodiments, the total energy storage capacity of the capacitive conductor is between 30-450 kilojoules (kJ).

In a preferred embodiment, the capacitive conductor 208 includes 500 bundles configured in series, with each bundle 400 including 7 wire-shaped capacitors 306. In this embodiment, each bundle 400 may be approximately 0.5 inches wide and 100 millimeters long, not including the thin ribbons of conductive material 402 between adjoining bundles 400. Therefore, in this embodiment, the capacitive conductor section of the capacitive conductor 208 extends for approximately 165 feet. Moreover, assuming a 4 F/2V capability for each wire-shaped capacitor 306, this embodiment of the capacitive conductor includes a total voltage rating of 1,000 V (i.e., 2 V/bundle×500 bundles) and a capacitance value of 56 mF. This translates to a total energy storage capacity of 56 kJ, according to the equation $E=\frac{1}{2}CV^2$, where E is the total stored energy, C is the total capacitance, and V is the total voltage.

Figure 5:
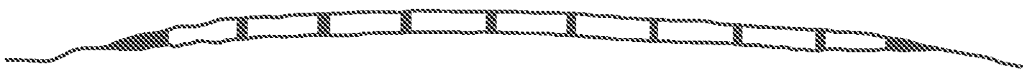
FIG. 5 is a schematic view of an exemplary embodiment of the wire-shaped capacitor that is integrated within the capacitive conductor of the capacitive cable described herein.

FIG. 5 is a schematic view of an exemplary embodiment of the wire-shaped capacitor 306 that is integrated within the capacitive conductor 208 of the capacitive cable 200 described herein. Like numbered items are as described with respect to FIGS. 2, 3, and 4. As shown in FIG. 5, the wire-shaped capacitor 306 includes a flexible, wire-shaped form factor. In some embodiments, the wire-shaped capacitor 306 is constructed out of series-connected, supercapacitor-performing cells. For example, in some embodiments, the wire-shaped capacitor 306 is constructed based on the Cable-Based Capacitor (CBC) technology developed by Capacitech Energy, Inc.

The schematic views of FIGS. 2-5 are not intended to indicate that the capacitive cable 200 is to include all of the components shown in FIGS. 2-5, or that the capacitive cable 200 is limited to only the components shown in FIGS. 2-5. Rather, any number of components may be omitted from the capacitive cable 200 or added to the capacitive cable 200, depending on the details of the specific implementation. For example, while the capacitive cable 200 is depicted as a round cable in FIGS. 2-5, the capacitive cable 200 may also be a flat cable in some embodiments. This may be particularly beneficial for applications in which the inner diameter of the casing is limited.

Method for Operating Downhole Electro-Hydraulic Tool Using Capacitive Cable

Figure 6:
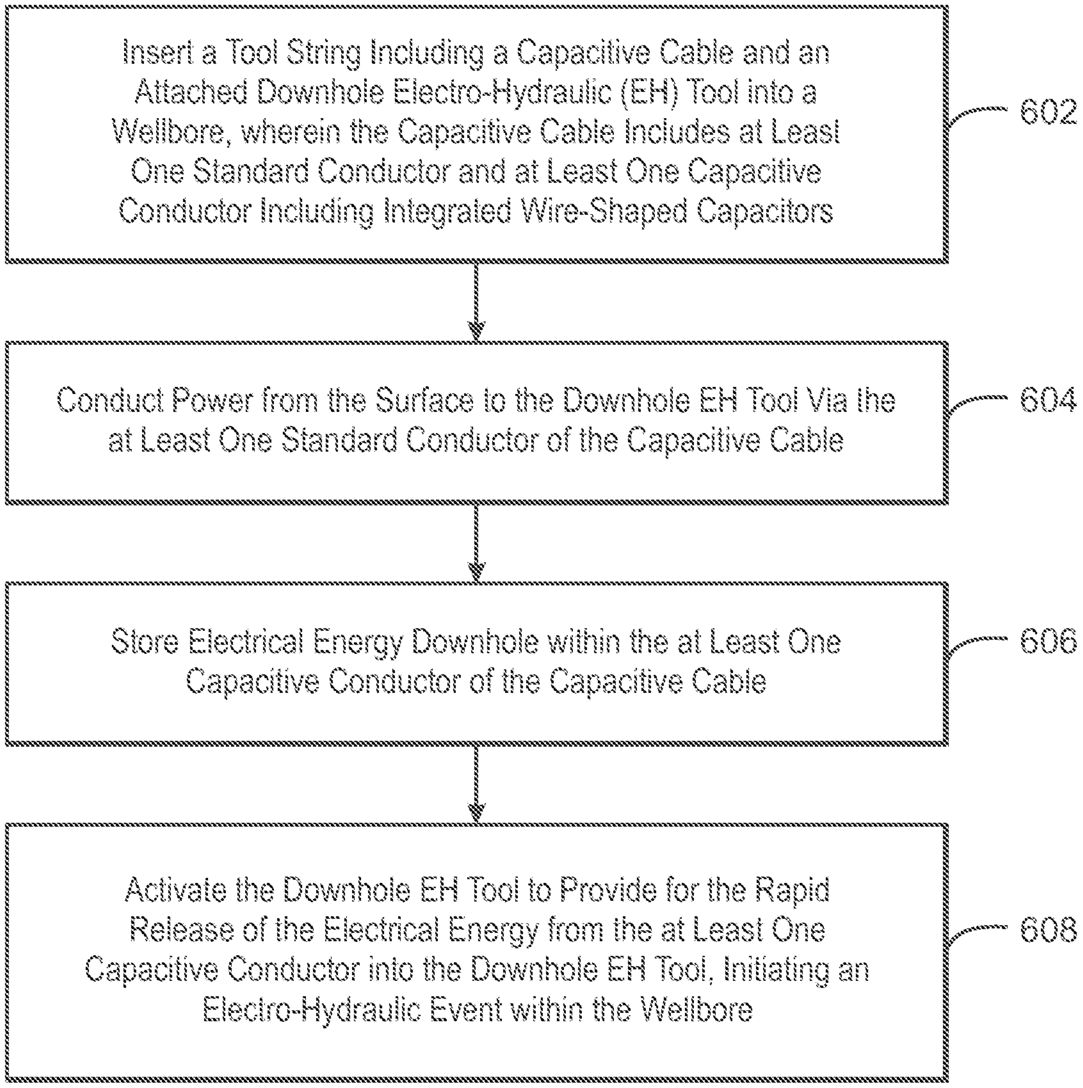
FIG. 6 is a process flow diagram of a method for operating a downhole EH tool using a capacitive cable.

FIG. 6 is a process flow diagram of a method 600 for operating a downhole EH tool using a capacitive cable. In various embodiments, the capacitive cable is as described with respect to any of FIGS. 1-5. The method 600 begins at block 602, at which a tool string including a capacitive cable and an attached downhole EH tool is inserted into a wellbore. The capacitive cable includes at least one standard conductor and at least one capacitive conductor with integrated wire-shaped capacitors. In various embodiments, the at least one capacitive conductor of the capacitive cable is provided by configuring multiple wire-shaped capacitors in parallel to form bundles of wire-shaped capacitors, and connecting multiple bundles in series using a thin ribbon of conductive material between adjoining bundles. Specifically, in some embodiments, 400-4,000 bundles are configured in series, where each bundle is formed using 5-9 wire-shaped capacitors configured in parallel. Moreover, in some embodiments, one or more capacitive conductor sections are spliced to one or more standard conductor sections to form the at least one capacitive conductor.

At block 604, power is conducted from the surface to the downhole EH tool via the at least one standard conductor of the capacitive cable. At block 606, electrical energy is stored downhole within the at least one capacitive conductor of the capacitive cable. In some embodiments, this includes storing between 30-450 kilojoules (kJ) within the at least one capacitive conductor.

Furthermore, at block 606, the downhole EH tool is activated to provide for the rapid release of the electrical energy from the at least one capacitive conductor into the downhole EH tool, initiating an electro-hydraulic event within the wellbore. In various embodiments, this includes initiating electro-hydraulic fracturing of the formation surrounding the wellbore in the vicinity of the EH tool.

The process flow diagram of FIG. 6 is not intended to indicate that the steps of the method 600 are to be executed in any particular order, or that all of the steps of the method 600 are to be included in every case. Further, any number of additional steps not shown in FIG. 6 may be included within the method 600, depending on the details of the specific implementation.

For certain jurisdictions, the following embodiments are also provide:

1. A capacitive cable, comprising:
   at least one standard conductor; and
   at least one capacitive conductor comprising integrated wire-shaped capacitors.
2. The capacitive cable of claim 1, wherein the capacitive conductor comprises bundles of wire-shaped capacitors configured in series, and wherein each bundle comprises wire-shaped capacitors configured in parallel.
3. The capacitive cable of claim 2, wherein the capacitive conductor comprises 400-4,000 bundles.
4. The capacitive cable of claim 2, wherein each bundle comprises 5-9 wire-shaped capacitors configured in parallel.
5. The capacitive cable of claim 2, wherein adjoining bundles are connected to each other via a thin ribbon of conductive material.
6. The capacitive cable of any one of claims from 1 to 5, wherein the capacitive conductor comprises one or more capacitive conductor sections spliced to one or more standard conductor sections.
7. The capacitive cable of any one of claims from 1 to 6, wherein a total energy storage capacity of the capacitive conductor is between 30-450 kilojoules (kJ).
8. A method for operating a downhole electro-hydraulic (EH) tool using a capacitive cable, comprising:
   inserting a tool string comprising a capacitive cable and an attached downhole EH tool into a wellbore, wherein the capacitive cable comprises at least one standard conductor and at least one capacitive conductor comprising integrated wire-shaped capacitors;
   conducting power from a surface to the downhole EH tool via the at least one standard conductor of the capacitive cable;
   storing electrical energy downhole within the at least one capacitive conductor of the capacitive cable; and
   activating the downhole EH tool to provide for the rapid release of the electrical energy from the at least one capacitive conductor into the downhole EH tool, initiating an electro-hydraulic event within the wellbore.
9. The method of claim 8, comprising providing the at least one capacitive conductor of the capacitive cable by:
   forming bundles of wire-shaped capacitors, wherein each bundle comprises multiple wire-shaped capacitors configured in parallel; and
   connecting the bundles in series using a thin ribbon of conductive material between adjoining bundles.
10. The method of claim 9, comprising forming each bundle using 5-9 wire-shaped capacitors configured in parallel.
11. The method of claim 9, comprising connecting 400-4,000 bundles in series.
12. The method of any one of claims from 8 to 11, comprising providing the at least one capacitive conductor of the capacitive cable by splicing one or more capacitive conductor sections to one or more standard conductor sections.
13. The method of any one of claims from 8 to 12, wherein storing the electrical energy downhole within the at least one capacitive conductor comprises storing between 30-450 kilojoules (kJ) within the at least one capacitive conductor.
14. The method of any one of claims from 8 to 13, wherein activating the downhole EH tool to initiate the electro-hydraulic event within the wellbore comprises activating the downhole EH tool to initiate electro-hydraulic fracturing of a formation surrounding the wellbore in a vicinity of the EH tool.

While the embodiments described herein are well-calculated to achieve the advantages set forth, it will be appreciated that the embodiments described herein are susceptible to modification, variation, and change without departing from the spirit thereof. Indeed, the present techniques include all alternatives, modifications, and equivalents falling within the true spirit and scope of the appended claims.

What is claimed is:

1. A capacitive cable, comprising:
at least one standard conductor; and
at least one capacitive conductor comprising integrated wire-shaped capacitors,
wherein the capacitive conductor comprises bundles of wire-shaped capacitors configured in series, and wherein each bundle comprises wire-shaped capacitors configured in parallel.

2. The capacitive cable of claim 1, wherein the capacitive conductor comprises 400-4,000 bundles.

3. The capacitive cable of claim 1, wherein each bundle comprises 5-9 wire-shaped capacitors configured in parallel.

4. The capacitive cable of claim 1, wherein adjoining bundles are connected to each other via a thin ribbon of conductive material.

5. The capacitive cable of claim 1, wherein the capacitive conductor comprises one or more capacitive conductor sections spliced to one or more standard conductor sections.

6. The capacitive cable of claim 1, wherein a total energy storage capacity of the capacitive conductor is between 30-450 kilojoules (kJ).

7. A method for operating a downhole electro-hydraulic (EH) tool using a capacitive cable, comprising:
inserting a tool string comprising a capacitive cable and an attached downhole EH tool into a wellbore, wherein the capacitive cable comprises at least one standard conductor and at least one capacitive conductor comprising integrated wire-shaped capacitors;
conducting power from a surface to the downhole EH tool via the at least one standard conductor of the capacitive cable;
storing electrical energy downhole within the at least one capacitive conductor of the capacitive cable; and
activating the downhole EH tool to provide for the rapid release of the electrical energy from the at least one capacitive conductor into the downhole EH tool, initiating an electro-hydraulic event within the wellbore.

8. The method of claim 7, comprising providing the at least one capacitive conductor of the capacitive cable by:
forming bundles of wire-shaped capacitors, wherein each bundle comprises multiple wire-shaped capacitors configured in parallel; and
connecting the bundles in series using a thin ribbon of conductive material between adjoining bundles.

9. The method of claim 8, comprising forming each bundle using 5-9 wire-shaped capacitors configured in parallel.

10. The method of claim 8, comprising connecting 400-4,000 bundles in series.

11. The method of claim 8, comprising providing the at least one capacitive conductor of the capacitive cable by splicing one or more capacitive conductor sections to one or more standard conductor sections.

12. The method of claim 7, wherein storing the electrical energy downhole within the at least one capacitive conductor comprises storing between 30-450 kilojoules (kJ) within the at least one capacitive conductor.

13. The method of claim 7, wherein activating the downhole EH tool to initiate the electro-hydraulic event within the wellbore comprises activating the downhole EH tool to initiate electro-hydraulic fracturing of a formation surrounding the wellbore in a vicinity of the EH tool.

14. A tool string, comprising:

a downhole electro-hydraulic (EH) tool that is coupled to a capacitive cable; and the capacitive cable, comprising:

at least one standard conductor; and at least one capacitive conductor comprising integrated wire-shaped capacitors; wherein the capacitive cable is configured to:

deliver power from a surface to the downhole EH tool via the at least one standard conductor;

store electrical energy downhole within the at least one capacitive conductor; and rapidly deliver the electrical energy from the at least one capacitive conductor to the downhole EH tool in response to an activation of the downhole EH tool.

15. The tool string of claim 14, wherein the capacitive conductor comprises bundles of wire-shaped capacitors configured in series, and wherein each bundle comprises wire-shaped capacitors configured in parallel.

16. The tool string of claim 15, wherein the capacitive conductor comprises 400-4,000 bundles.

17. The tool string of claim 15, wherein each bundle comprises 5-9 wire-shaped capacitors configured in parallel.

18. The tool string of claim 15, wherein adjoining bundles are connected to each other via a thin ribbon of conductive material.

19. The tool string of claim 14, wherein the capacitive conductor comprises one or more capacitive conductor sections spliced to one or more standard conductor sections.

* * * * *